J. LAUGHLIN.
Whiffletree.

No. 5,221.　　　　　　　　　　　　　Patented Aug. 7, 1847.

UNITED STATES PATENT OFFICE.

JNO. LAUGHLIN, OF GETTYSBURG, PENNSYLVANIA.

WHIFFLETREE.

Specification of Letters Patent No. 5,221, dated August 7, 1847.

*To all whom it may concern:*

Be it known that I, JOHN LAUGHLIN, of Gettysburg, in the county of Adams and State of Pennsylvania, have invented a new and Improved Swingletree for Detaching Horses from Carriages in Cases of Danger, and that the following is a full, clear, and exact description of the principle or character which distinguishes it from all other things before known and of the manner of making, constructing, and using the same, reference being had to the accompanying drawing, making part of this specification, in which—

Figure 1:
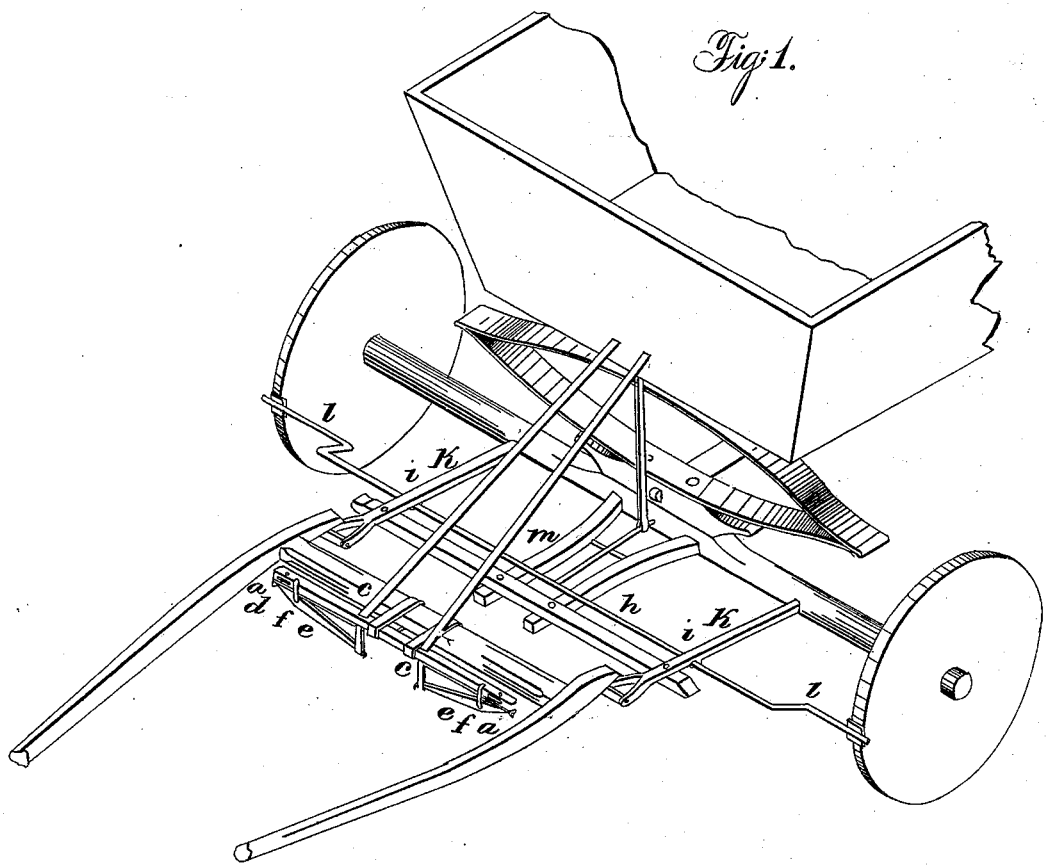
Figure 2:
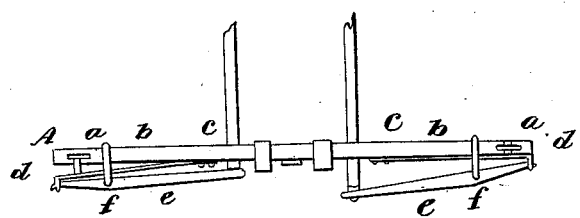

Figure 1 is an isometrical view of the front part of a carriage showing the mode of attaching the break and swingletree; and Fig. 2, an enlarged view of the swingletree detached.

The same letters indicate like parts in all the figures.

Several swingletrees have been made for detaching the horses by means of movable bolts and springs, the bolts being withdrawn by means of straps, chains, or other fixtures, but the difficulties heretofore unsurmounted have been, either that the apparatus had an unpleasant rattling from the arrangement of the parts, or the springs were necessarily made so weak that the traces were liable to be unhitched while traveling; or else it was found, when the springs were sufficiently strong, that it required so much force to withdraw the bolts as to render the fixture useless in practice.

To obviate the above enumerated difficulties, I construct my swingletree of iron or other suitable material of common form with a mortise ($a$) in each end; underneath the swingletree two springs ($b$) are affixed at points ($c$) and extend out to the ends of the swingletree; a bolt ($d$) is attached to each of these springs that extends up through the mortise ($a$) as clearly shown in Fig. 2: the end of the spring is turned down and has an eye formed in it into which a lever ($e$) hooks, said lever having its fulcrum at ($f$) by which it is attached to the swingletree; to the inner end of the lever ($e$) a strap is connected that extends up through a mortise in the swingletree and thence up to the carriage when it can be drawn by the hand of the driver at pleasure, which, by means of this lever ($e$) has a great purchase on the spring to draw the bolt and by reason of which a very stiff spring can be used. This lever ($e$) is also found a great convenience in hitching or unhitching the horse, for by bearing on it with the hand it draws down the spring, and with it the bolt is withdrawn from the mortise as is represented at the end (A) of the swingletree in Fig. 2.

What I claim as my invention and desire to secure by Letters Patent is—

The combination of the lever ($e$) with the spring bolt for attaching the traces to the swingletree and detaching them therefrom, substantially in the manner and for the purpose set forth.

JOHN LAUGHLIN.

Witnesses:
A. P. BROWNE,
J. J. GREENOUGH.